United States Patent
Watanabe

(12)
(10) Patent No.: US 6,491,748 B2
(45) Date of Patent: Dec. 10, 2002

(54) AQUEOUS PIGMENT INK SETS FOR COLOR INKJET RECORDING, COLOR INKJET RECORDING METHOD, AND COLOR INKJET RECORDED MATTER

(75) Inventor: Kazuaki Watanabe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/755,885

(22) Filed: Jan. 5, 2001

(65) Prior Publication Data

US 2001/0025586 A1 Oct. 4, 2001

Related U.S. Application Data

(63) Continuation of application No. 09/549,273, filed on Apr. 14, 2000.

(30) Foreign Application Priority Data

Apr. 14, 1999 (JP) ............................................. 11-107191
Apr. 10, 2000 (JP) ......................................... 2000-107858

(51) Int. Cl.⁷ ................................................ C09D 11/02
(52) U.S. Cl. ...................................................... 106/31.6
(58) Field of Search ........................................ 106/31.6

(56) References Cited

U.S. PATENT DOCUMENTS

| 5,833,743 A | | 11/1998 | Elwakil .................... 106/31.27 |
| 5,846,306 A | * | 12/1998 | Kubota et al. ............. 106/31.6 |
| 5,900,899 A | | 5/1999 | Ichizawa et al. ............ 347/100 |
| 6,030,441 A | * | 2/2000 | Kubota et al. ........... 106/31.75 |
| 6,077,338 A | * | 6/2000 | Wallstrom .................. 106/31.6 |
| 6,290,762 B1 | * | 9/2001 | Elwakil .................... 106/31.27 |

FOREIGN PATENT DOCUMENTS

EP 0831135 3/1998

\* cited by examiner

*Primary Examiner*—Helene Klemanski
(74) *Attorney, Agent, or Firm*—Ladas & Parry

(57) ABSTRACT

Provided are aqueous pigment ink sets for color inkjet recording which solve the degeneration of the color balance of printed matter. One aqueous pigment ink set includes yellow ink, cyanide ink, and magenta ink, wherein the sedimentary degree of yellow ink is 40% or less, the sedimentary degree of cyanide ink is 30% or less, and the sedimentary degree of magenta ink is 15% or less.

22 Claims, No Drawings

AQUEOUS PIGMENT INK SETS FOR COLOR INKJET RECORDING, COLOR INKJET RECORDING METHOD, AND COLOR INKJET RECORDED MATTER

This application is a continuation of application Ser. No. 09/549,273, filed Apr. 14, 2000.

BACKGROUND OF THE INVENTION

1. Field of the Invention

The present invention relates to aqueous pigment ink sets for color inkjet recording, color inkjet recording method, and color inkjet recorded matter.

2. Description of the Related Art

Demands for pigment ink in place of dye ink as the ink for color inkjet recording have been increasing in recent years. This is due to pigment ink being superior to dye ink in terms of various physical properties such as light resistance and water resistance.

Nevertheless, as pigment ink is water-insoluble, it is necessary to prepare ink in the form of an aqueous dispersed liquid with pigment particles dispersed in water. When this aqueous dispersed liquid; i.e. pigment ink, is stored in the ink storage chamber of a printer for a long period of time, sedimentation of pigment particles will occur in the ink liquid. Thus, a gradient will occur to the density of the pigment particles in the ink liquid, and differences will arise between the coloration of the image printed with the ink at the upper part of the ink storage chamber and the coloration of the image printed with the ink at the bottom of the ink storage chamber.

Upon studying the dispersibility of the aqueous pigment ink suitable as the ink for color inkjet recording, the present inventors have discovered that the sedimentary degree of the aqueous pigment ink differs for each ink color, and that certain colors of ink tend to sediment more than other colors. Further discovered was that the sedimentation of certain colors influenced the coloration of printed matter more than other colors. Therefore, if an ink set prepared by combining various aqueous pigment inks without consideration to the differences in the sedimentary degree or the influence to the coloration caused by such sedimentation is stored in the ink storage chamber of a printer for a long period of time, differences will arise in the sedimentary degree between the pigment ink of the various colors, and there were cases in which the color balance of the printed matter degenerated.

While conducting an intense study for a method of not degenerating the aforementioned color balance, the present inventors discovered that this problem can be resolved by combining selected inks upon providing a difference in altitude to the upper limit of the sedimentary degree of the respective inks in accordance with a certain fixed rule. The present invention was devised pursuant to such discovery.

SUMMARY OF THE INVENTION

Accordingly, the present invention relates to an aqueous pigment ink set for color inkjet recording, comprising: yellow ink; cyan ink; and magenta ink; wherein the sedimentary degree of yellow ink is 40% or less, the sedimentary degree of cyan ink is 30% or less, and the sedimentary degree of magenta ink is 15% or less.

The present invention further relates to an aqueous pigment ink set for color inkjet recording, comprising: yellow ink; cyan ink; magenta ink; and black ink; wherein the sedimentary degree of yellow ink is 40% or less, the sedimentary degree of cyan ink is 30% or less, the sedimentary degree of magenta ink is 15% or less, and the sedimentary degree of black ink is 15% or less.

The present invention further relates to an aqueous pigment ink set for color inkjet recording, comprising: yellow ink; cyan ink; magenta ink; and light cyan ink and/or light magenta ink; wherein the sedimentary degree of yellow ink is 40% or less, the sedimentary degree of cyan ink is 30% or less, the sedimentary degree of light cyan ink is 30% or less, the sedimentary degree of magenta ink is 15% or less, and the sedimentary degree of light magenta ink is 15% or less.

The present invention further relates to an aqueous pigment ink set for color inkjet recording, comprising: yellow ink; cyan ink; magenta ink; light cyan ink and/or light magenta ink; and black ink; wherein the sedimentary degree of yellow ink is 40% or less, the sedimentary degree of cyan ink is 30% or less, the sedimentary degree of light cyan ink is 30% or less, the sedimentary degree of magenta ink is 15% or less, the sedimentary degree of light magenta ink is 15% or less, and the sedimentary degree of black ink is 15% or less.

The present invention further relates to an aqueous pigment ink set for color inkjet recording, comprising: green ink and/or orange ink; yellow ink; cyan ink; and magenta ink; wherein the sedimentary degree of green ink is 60% or less, the sedimentary degree of yellow ink is 40% or less, the sedimentary degree of orange ink is 40% or less, the sedimentary degree of cyan ink is 30% or less, and the sedimentary degree of magenta ink is 15% or less.

The present invention further relates to an aqueous pigment ink set for color inkjet recording, comprising: green ink and/or orange ink; yellow ink; cyan ink; magenta ink; and black ink; wherein the sedimentary degree of green ink is 60% or less, the sedimentary degree of yellow ink is 40% or less, the sedimentary degree of orange ink is 40% or less, the sedimentary degree of cyan ink is 30% or less, the sedimentary degree of magenta ink is 15% or less, and the sedimentary degree of black ink is 15% or less.

The present invention further relates to a color inkjet recording method for recording images by using the ink sets mentioned above.

The present invention further relates to color inkjet recorded matter having recorded thereon images using the ink sets mentioned above.

The aqueous pigment ink sets for color inkjet recording (hereinafter simply referred to as the "pigment ink set") of the present invention are explained in detail below.

A pigment ink set according to the present invention comprises: yellow ink; cyan ink; and magenta ink; wherein the sedimentary degree of yellow ink is 40% or less, the sedimentary degree of cyan ink is 30% or less, and the sedimentary degree of magenta ink is 15% or less. According to this structure, the pigment ink set of the present invention is capable of realizing printed matter superior in color balance as the influence to the coloration of printed matter caused by sedimentation is set appropriately.

As ink to be included in the pigment ink set of the present invention, other than the requisite structural elements of yellow ink, cyan ink, and magenta ink, for example, used may be black ink, light cyan ink, light magenta ink, green ink, orange ink, and so on. Further, as ink to be included in the pigment ink set of the present invention, other than those mentioned above, used may be red ink, blue ink, and so forth as necessary.

The expression "sedimentary degree" used herein shall mean the degree of pigment particles that sediment when ink is placed still. Specifically, as explained in the Examples described later, the sedimentary degree may be measured with the following method.

One hundred and ten milliliters of ink is put into a sample bottle having an inside diameter of 30 mm, and the bottle is placed still standing with care so as not to inflict vibration thereto. Immediately after placing the bottle, 10 ml of the uppermost layer of the ink is sampled, and the initial absorbancy is measured. Then, after having left the bottle still standing for 6 months, 10 ml of the uppermost layer of the ink is sampled, and the absorbancy after placement is measured. The sedimentary degree can be calculated from the following formula (1):

$$P=100\times(A-B)/A \qquad (1)$$

Here, P is the sedimentary degree (%), A is the initial absorbancy, and B is the absorbency after placement.

In the present invention, the sedimentary degree of the respective inks may be adjusted by appropriately selecting the type and amount of dispersant to be used in accordance with the type and particle size of the pigment to be used.

Further, the sedimentary degree of the respective inks may also be adjusted by appropriately controlling the particle size of the pigment to be used, type of dispersion apparatus to be used, method of classification treatment, dispersion time (agitation time of the mixture containing the pigment and dispersant), etc.

Without particular restrictions other than the point of the aforementioned sedimentary degree, arbitrary pigments (i.e., inorganic pigments and/or organic pigments) and arbitrary dispersants may be used as the pigment and dispersant in the present invention.

Even upon using an ink set preserved within the ink storage chamber for a long period of time until printing, the color image obtained with the method of recording images using the pigment ink set of the present invention is capable of making the degeneration of color balance of the overall color image visually inconspicuous as differences in the shading between the respective inks will not arise easily.

Moreover, the color inkjet recorded matter having recorded thereon images using the pigment ink sets of the present invention is prominent in that the color balance of the overall color image is well balanced.

DESCRIPTION OF THE PREFERRED EMBODIMENTS

The pigment ink set of the present invention is now explained in detail pursuant to the preferred embodiments thereof.

The pigment ink set according to the first embodiment of the present invention includes at least yellow ink, cyan ink, and magenta ink. In this ink set, the sedimentary degree (Y) of yellow ink is 40% or less, preferably 30% or less; the sedimentary degree (C) of cyan ink is 30% or less, preferably 20% or less; and the sedimentary degree (M) of magenta ink is 15% or less, preferably 10% or less. In this ink set, it is preferable that the sedimentary degree (M) of magenta ink, the sedimentary degree (C) of cyan ink, and the sedimentary degree (Y) of yellow ink satisfy the following relationship:

$$M<C<Y$$

Further, in the ink set of the first embodiment, it is preferable that yellow ink, cyan ink, and magenta ink have sedimentary degrees in the order conforming to the differences in altitude of their respective lightness.

Therefore, if the lightness of these inks become yellow ink>cyan ink>magenta ink in this order from high to low, the sedimentary degree of the respective inks are set to be the same as the order of such lightness. In other words, here, by setting the sedimentary degree of the respective inks to be yellow ink>cyan ink>magenta ink in this order from high to low, the effects of the present invention are improved.

The term "lightness" used herein shall indicate the L* in the L*a*b* color system set forth by CIE (Commission Internationale de l'Eclairage) in 1976, and shall mean the brightness of printed matter (images) upon printing on recording media with the same printing duty.

The pigment ink set according to the second embodiment of the present invention includes at least yellow ink, cyan ink, magenta ink, and black ink. In this ink set, the sedimentary degree (Y) of yellow ink is 40% or less, preferably 30% or less; the sedimentary degree (C) of cyan ink is 30% or less, preferably 20% or less; the sedimentary degree (M) of magenta ink is 15% or less, preferably 10% or less; and the sedimentary degree (K) of black ink is 15% or less, preferably 5% or less. In this ink set, it is preferable that the sedimentary degree (M) of magenta ink, the sedimentary degree (C) of cyan ink, the sedimentary degree (Y) of yellow ink, and the sedimentary degree (K) of black ink satisfy the following relationship:

$$K \leq M<C<Y$$

Further, similar to the reason of the ink set described in the first embodiment, in the ink set of the second embodiment, it is preferable that yellow ink, cyan ink, magenta ink, and black ink have sedimentary degrees in the order conforming to the differences in altitude of their respective lightness.

The pigment ink set according to the third embodiment of the present invention includes at least magenta ink, cyan ink, yellow ink, and light magenta ink and/or light cyan ink. In this ink set, the sedimentary degree (Y) of yellow ink is 40% or less, preferably 30% or less; the sedimentary degree (C) of cyan ink is 30% or less, preferably 20% or less; the sedimentary degree (Lc) of light cyan ink is 30% or less, preferably 20% or less; the sedimentary degree (M) of magenta ink is 15% or less, preferably 10% or less; and the sedimentary degree (Lm) of light magenta ink is 15% or less, preferably 10% or less.

In this ink set, it is preferable that the sedimentary degree (M) of magenta ink, the sedimentary degree (Lm) of light magenta ink, the sedimentary degree (C) of cyan ink, the sedimentary degree (Lc) of light cyan ink, and the sedimentary degree (Y) of yellow ink satisfy the following relationship:

$$Lm \leq M<Lc \leq C<Y$$

Moreover, the aforementioned "light magenta" means a light shade of magenta, and the aforementioned "light cyan" means a light shade of cyan. The light magenta ink used in this invention, in comparison to ordinary methods, for example, can be prepared easily by reducing the amount of pigment content to be used in the preparation of magenta ink. The light cyan ink used in this invention also, in comparison to ordinary methods, for example, can be prepared easily by reducing the amount of pigment content to be used in the preparation of cyan ink.

The pigment ink set according to the fourth embodiment of the present invention includes at least magenta ink, cyan ink, yellow ink, light magenta ink and/or light cyan ink, and black ink. In this ink set, the sedimentary degree (Y) of yellow ink is 40% or less, preferably 30% or less; the sedimentary degree (C) of cyan ink is 30% or less, preferably 20% or less; the sedimentary degree (Lc) of light cyan ink is 30% or less, preferably 20% or less; the sedimentary degree (M) of magenta ink is 15% or less, preferably 10% or less; the sedimentary degree (Lm) of light magenta ink is 15% or less, preferably 10% or less; and the sedimentary degree (K) of black ink is 15% or less, preferably 5% or less.

In this ink set, it is preferable that the sedimentary degree (K) of black ink, the sedimentary degree (M) of magenta ink, the sedimentary degree (Lm) of light magenta ink, the sedimentary degree (C) of cyan ink, the sedimentary degree (Lc) of light cyan ink, and the sedimentary degree (Y) of yellow ink satisfy the following relationship:

$$K \leq Lm \leq M < Lc \leq C < Y$$

The pigment ink set according to the fifth embodiment of the present invention includes at least magenta ink, cyan ink, yellow ink, green ink, and orange ink. In this ink set, the sedimentary degree (G) of green ink is 60% or less, preferably 50% or less; the sedimentary degree (Y) of yellow ink is 40% or less, preferably 30% or less; the sedimentary degree (O) of orange ink is 40% or less, preferably 30% or less; the sedimentary degree (C) of cyan ink is 30% or less, preferably 20% or less; and the sedimentary degree (M) of magenta ink is 15% or less, preferably 10% or less. In this ink set, it is preferable that the sedimentary degree (M) of magenta ink, the sedimentary degree (C) of cyan ink, the sedimentary degree (O) of orange ink, the sedimentary degree (Y) of yellow ink, and the sedimentary degree (G) of green ink satisfy the following relationship:

$$M < C < O \leq Y < G.$$

The pigment ink set according to the sixth embodiment of the present invention includes at least magenta ink, cyan ink, yellow ink, green ink, orange ink, and black ink. In this ink set, the sedimentary degree (G) of green ink is 60% or less, preferably 50% or less; the sedimentary degree (Y) of yellow ink is 40% or less, preferably 30% or less; the sedimentary degree (O) of orange ink is 40% or less, preferably 30% or less; the sedimentary degree (C) of cyanide ink is 30% or less, preferably 20% or less; the sedimentary degree (M) of magenta ink is 15% or less, preferably 10% or less; and the sedimentary degree (K) of black ink is 15% or less, preferably 5% or less.

In this ink set, it is preferable that the sedimentary degree (M) of magenta ink, the sedimentary degree (C) of cyan ink, the sedimentary degree (O) of orange ink, the sedimentary degree (Y) of yellow ink, the sedimentary degree (G) of green ink, and the sedimentary degree (K) of black ink satisfy the following relationship:

$$K \leq M < C < O \leq Y < G.$$

In the aforementioned first to sixth embodiments, the sedimentary degree of the respective inks may be adjusted by appropriately selecting, from preferable examples and ranges described later, the type and amount of dispersant to be used in accordance with the type and particle size of the pigment to be used.

As pigments of the respective inks conforming to the pigment ink sets of the aforementioned first to sixth embodiments, in addition to titanium oxide and iron oxide as inorganic pigments, used may be carbon black manufactured with well-known methods such as the contact method, furnace method, or thermal method. Further, as organic pigments, used may be azo pigments (including azolake, insoluble azo pigments, condensed azo pigments, chelate azo pigments, etc.), polycyclic pigments (e.g., phthalocyanine pigments, perylene, pigments, berynone pigments, anthraquinone pigments, quinacridone pigments, dioxygen pigments, thioindigo pigments, isoindolinone pigments, and quinophthalone pigments), dye chelates (e.g., basic dye chelates and acidic dye chelates), nitro pigments, nitroso pigments, aniline black pigments, and so on.

As pigments of the respective inks especially conforming to the pigment ink sets of the aforementioned first to sixth embodiments, used are the following pigments.

C.I. pigment yellow 74, 109, or 110 is used as the yellow pigment; C.I. pigment red 122 is used as the magenta pigment; C.I. pigment blue 15:3 is used as the cyan pigment; C.I. pigment black 7 is used as the black pigment; C.I. pigment orange 36 or 43 is used as the orange pigment; and C.I. pigment green 7 or 36 is used as the green pigment.

With respect to the particle size of the pigment, the cumulative average diameter is preferably 0.01 $\mu$m~0.25 $\mu$m, and more preferably 0.05 $\mu$m~0.2 $\mu$m. The expression "cumulative average diameter" is, upon seeking the cumulative curve of the particle size when the overall volume of the aggregate of subject particles is 100%, the diameter when such cumulative curve is 50%. This cumulative average diameter is sometimes referred to as the central diameter or media diameter, and is generally used as the average diameter of dispersed particles such as pigment dispersed liquids and so on.

In the first to sixth embodiments, it is preferable to prepare ink from pigment dispersed liquids obtained from dispersing the pigments with dispersants. As a preferable dispersant, used may be well-known dispersants; for example, macromolecular dispersants or surface active agents, utilized for preparing conventional pigment dispersed liquids.

As macromolecular dispersants, used may be natural macromolecular compounds; for example, proteins such as glue, gelatin, casein and albumin; natural rubbers such as gum arabic and tragacanth gum; glucoside such as saponin; alginic acid derivatives such as alginic acid, alginic acid propyleneglycol ester, triethanolamine alginate, and ammonium alginate; and cellulose derivatives such as methylcellulose, carboxymethylcellulose, hydroxyethylcellulose, and ethylhydroxyethylcellulose.

Moreover, synthetic macromolecular compounds may be used as macrcmolecular dispersants. As such synthetic macromolecular compounds, for example, used may be polyvinylalcohol; polyvinylpyrolidone; acrylic resin and its derivatives such as polyacrylic acid, acrylic acid-acrylonitrile copolymer, potassium acrylate-acrylonitrile copolymer, vinyl acetate-acrylate ester copolymer, and acrylic acid-alkyl acrylate ester copolymer; styrene-acrylic acid resins such as styrene-acrylic acid copolymer, styrene-methacrylic acid copolymer, styrene-methacrylic acid-acrylic alkyl ester copolymer, and stryene-α-methylstyrene-acrylic acid-acrylic alkyl ester copolymer; styrene-maleic acid; styrene-maleic anhydride; vinylnaphthalene-acrylic acid copolymer; vinylnaphthalene-maleic acid copolymer; and vinyl acetate copolymers such as vinyl acetate-ethylene copolymer, vinyl acetate-fatty acid vinyl ester-ethylene copolymer, vinyl acetate-maleic acid ester copolymer, vinyl acetate-crotonic acid copolymer, and vinyl acetate-acrylic acid copolymer; and the salts thereof.

Among the above, particularly preferable are copolymers formed from monomers having a hydrophobic group and monomers having a hydrophilic group, and polymers formed from monomers having both a hydrophobic group and hydrophilic group. As the aforementioned salts, used may be salts composed of the likes of diethylamine, ammonia, ethylamine, triethylamine, propylamine, isopropylamine, dipropylamine, butylamine, isobutylamine, triethanolamine, diethanolamine, aminomethylpropanol, and morpholine. The weight-average molecular weight of these copolymers is preferably 3,000~30,000, and more preferably 5,000~15,000.

Furthermore, surface active agents preferable as dispersants are, for example, anionic surface active agents such as fatty acid salt, higher alkylcarbooxylic acid salt, higher alcohol sulfuric acid ester salt, higher alkylsulfonic acid, condensation product of higher fatty acid and amino acid, sulfosuccinic acid ester salt, naphthenic acid salt, liquid fatty oil sulfuric acid ester salt, and alkylallylsulfonic acid salt; cationic surface active agents such as fatty acid amine salt, quarternary ammonium salt, sulfonium salt, and phosphonium; and nonionic surface active agents such as polyoxyethylene alkyl ether, polyoxyethylene alkyl ester, solbitan alkyle ester, and polyoxyethylenesolbitan alkyl ester.

The additive amount of these dispersants is, to 1 part by weight of pigment, preferably in the range of 0.06~3 parts by weight, and more preferably in the range of 0.125~3 parts by weight.

In addition, it is preferable that the respective inks utilized in the pigment ink sets of the first to sixth embodiments include a wetting agent. As preferable examples of such wetting agents, there are diethyleneglycol, polyethyleneglycol, polypropyleneglycol, ethyleneglycol, propyleneglycol, butyleneglycol, triethyleneglycol, 1,2,6-hexanetriol, thioglycol, hexyleneglycol, glycerine, trimethylolethane, trimethylolpropane, urea, 2-pyrolidone, N-methyl-2-pyrolidone, and 1,3-dimethy-2-imidazolidinone. More preferably, used are those having an ethylene oxide group, and most preferably, used is diethylene glycol.

In addition to these wetting agents, it is preferable to further add a low boiling point organic solvent to the respective inks. As preferable examples of such low boiling point organic solvents, there are methanol, ethanol, n-propanol, iso-propanol, n-butanol, sec-butanol, tert-butanol, iso-butanol, n-pentanol, ethyleneglycol monomethyl ether, ethyleneglycol monoethyl ether, diethyleneglycol monomethyl ester, diethyleneglycol monoethyl ether, triethyleneglycol monomethyl ether, triethyleneglycol monoethyl ether, and particularly preferable is monohyydric alcohol.

The appropriate additive amount of these wetting agents is 0.5~40% by weight of ink, and preferably 2~20% by weight of ink. Moreover, the appropriate additive amount of low boiling point organic solvents is 0.5~10% by weight of ink, and preferably 1.5~6% by weight of ink.

The respective inks utilized for the pigment ink sets of the first to sixth embodiments may include a surface-active agent. As preferable examples of surface active agents, there are anionic surface-active agents (e.g., sodium dodecylbenzenesulfonate, sodium laurate, ammonium polyoxyethylenealkylethersulfate), nonionic surface active agents (e.g., polyoxyethylene alkyl ether, polyoxyethylene alkyl ester, polyoxyethylene solbitan fatty acid ester, polyoxyethylene alkylphenyl ether, polyoxyethylene alkylamine, polyoxyethylene alkylamide), and these may be used independently or in a mixture of two or more types of agents. It is further possible to use acetyleneglycol (Olefin Y, Sulfinol 82, 104, 440, 465, 485, and TG [all manufactured by Air Products and Chemicals Inc.]).

The respective inks utilized in the pigment ink sets of the first to sixth embodiments may also include saccharides. As examples of such saccharides, there are monosaccharides, disaccharides, oligosaccharides (including trisaccharides and tetrasaccharides) and polysaccharides. Preferably used are glucose, mannose, fructose, ribose, xylose, arabinose, galactose, aldonic acid, glycyseal, sorbitol, maltose, cellobiose, lactose, sucrose, trehalose, and maltotriose. Included in the aforementioned polysaccharides are alginic acid, α-cyclodextrin, and cellulose.

As derivatives of these saccharides, there are reducing sugars of such saccharides; for example, sugar alcohol, sugar oxide (e.g., aldonic acid, uronic acid), amino acid, and thio sugar. Particularly preferable is sugar alcohol, and maltitol, sorbitol, etc. are specific examples thereof.

The content of these saccharides is preferably 0.1~40% by weight of ink, and more preferably 0.5~30% by weight of ink.

The respective inks utilized for the pigment ink sets of the first to sixth embodiments may also include a resin emulsion. The term "resin emulsion" means an emulsion wherein the continuous phase is water, and the dispersion phase may be the likes of the following resin compositions. As resin compositions of the dispersion phase, there are acrylic resins, vinyl acetate resins, styrene-butadiene resins, vinyl chloride resins, acrylic-styrene resins, butadiene resins, and styrene resins.

According to the mode particularly conforming to the first to sixth embodiments, it is preferable that the abovementioned resin is a polymer having both hydrophilic and hydrophobic portions. Further, although there is no particular restriction on the particle size of these resin compositions upon forming an emulsion, the particle size is preferably 150 nm or less, and more preferably 5~100 nm.

These resin emulsions may be obtained by emulsifying and polymerizing monomers in water as necessary with a surface-active agent. For example, emulsions of acrylic resins or styrene-acrylic resins may be obtained by emulsifying and polymerizing (meta) acrylic acid ester or styrene, (meta) acrylic acid ester, and (meta) acrylic acid in water with a surface-active agent. It is preferable that the proportion of mixing the resin composition and the surface-active agent ordinarily be 1000:1~10:1. Favorable water resistance and permeability of ink can be obtained when the amount of surface-active agent used is less within the aforementioned range. Although there is no particular restriction on the surface-active agent, preferable examples are anion surface-active agents (e.g., sodium dodecylbenzenesulfonate, sodium laurate, ammonium polyoxyethylenealkylethersulfate), nonionic surface-active agents (e.g., polyoxyethylene alkyl ether, polyoxyethylene alkyl ester, polyoxyethylene solbitan fatty acid ester, polyoxyethylenealkylphenylether, polyoxyethylene alkyl amine, polyoxyethylene alkyl amide), and these may be used independently or in a mixture of two or more types of agents. It is further possible to use acetyleneglycol (Olefin Y, and Sulfinol 82, 104, 440, 465, and 485 [all manufactured by Air Products and Chemicals Inc.]).

An appropriate proportion of resin as the dispersion phase component and water shall be in the range of water 60~400 parts by weight, preferably 100~200 parts by weight, based on resin 100 parts by weight.

As the resin emulsions described above, used may be those conventionally known. For example, the respective resin emulsions described in Japanese Patent Publication No. 62-1426, Japanese Patent Laid-Open Publication No. 3-56573, Japanese Patent Laid-Open Publication No. 3-79678, Japanese Patent Laid-Open Publication No. 3-160068, and Japanese Patent Laid-Open Publication No. 4-18462 may be used as is.

Moreover, resin emulsions on the market may also be used. For example, used may be Microgel E-1002, E-5002 (styrene-acrylic resins emulsion; manufactured by Nippon Paint Co., Ltd.), Voncoat 4001 (acrylic resins emulsion; manufactured by Dainippon Ink and Chemicals, Incorporated), Voncoat 5454 (styrene-acrylic resins emulsion; manufactured by Dainippon Ink and Chemicals, Incorporated), SAE 1014 (styrene-acrylic resins emulstion; manufactured by Nihon Zeon K.K.), and Cybinol SK-200 (acrylic resins emulsion; manufactured by Saiden Chemical K.K.).

The respective inks utilized for the pigment ink sets of the first to sixth embodiments may also include, as necessary, pH regulation agents, antiseptics and/or mildew-proof agents.

The respective inks utilized for the pigment ink sets of the first to sixth embodiments may be prepared by dispersing and mixing the aforementioned compositions with an appropriate method. Preferably, a mixture having excluded therefrom organic solvents and volatile compositions is mixed with an appropriate disperser (e.g., ball mill, sand mill, atrighter, roll mill agitator mill, Henshell mixer, colloid mill, supersonic homogenizer, jet mill, ong mill) and made into a homogeneous composition, and organic solvents and volatile compositions are added thereto. Thereafter, it is preferable that the composition obtained above is subjected to filtering (preferably a decompressed or compressed filtration using a metal filter, membrane filter, etc.) or centrifugation for removing the large particles and foreign matter which are causes of clogging.

EXAMPLES

The present invention is now explained in detail with reference to the examples. These examples, however, shall not limit the scope of this invention in any way.

Examples 1~16 and Comparative Examples 1~11

Sixteen types of ink (ink 1~16) were prepared from the compound compositions listed below.

Compound Compositions:

pigment (specifically described in Table 1) amount described in Table 1 (% by weight)

styrene-acrylic acid copolymer amount described in Table 2 (% by weight)

sucrose—0.7% by weight multithorite—6.3% by weight glycerine—15% by weight 2-pyrolidone—2% by weight olfine E1010—1% by weight pure water—remaining amount Specifically, the pigment and dispersant (styrene-acrylic acid copolymer) were mixed, and then dispersed for 2 hours in a sand mill (manufactured by Yasukawa Seisakusho) together with glass beads (diameter=1.7 mm; 1.5 times the weight of mixture). Thereafter, the glass beads were removed, other compound compositions were added, and aggregated for 20 minutes at room temperature. Finally, ink was obtained by subjecting this result through a membrane filter of 5 μm. The type, amount, and color of the pigments used are shown in Table 1 below.

TABLE 1

| | Pigment Type | Concentration | Color |
|---|---|---|---|
| ink 1, 9 | carbon black | 2.5% by weight | black |
| ink 2, 10 | pigment yellow 74 | 3.5% by weight | yellow |
| ink 3, 11 | pigment magenta 122 | 3.0% by weight | magenta |
| ink 4, 12 | pigment cyan 15:3 | 2.0% by weight | cyan |
| ink 5, 13 | pigment magenta 122 | 0.75% by weight | L-magenta |
| ink 6, 14 | pigment cyan 15:3 | 0.5% by weight | L-cyan |
| ink 7, 15 | pigment orange 43 | 3.5% by weight | orange |
| ink 8, 16 | pigment green 7 | 3.5% by weight | green |

The amount of dispersant (styrene-acrylic acid copolymer) used is shown in Table 2 below.

TABLE 2

| | Concentration of Dispersant |
|---|---|
| ink 1 | 0.5% by weight |
| ink 2 | 0.7% by weight |
| ink 3 | 0.6% by weight |
| ink 4 | 0.4% by weight |
| ink 5 | 0.15% by weight |
| ink 6 | 0.1% by weight |
| ink 7 | 0.7% by weight |
| ink 8 | 0.7% by weight |
| ink 9 | 0.25% by weight |
| ink 10 | 0.35% by weight |
| ink 11 | 0.3% by weight |
| ink 12 | 0.2% by weight |
| ink 13 | 0.075% by weight |
| ink 14 | 0.05% by weight |
| ink 15 | 0.35% by weight |
| ink 16 | 0.35% by weight |

(Material Evaluation)

(1) Measurement of Sedimentary Degree

One hundred and ten milliliters of ink was put into a sample bottle having an inside diameter of 30 mm, and the bottle was placed still standing with care so as not to be inflicted with vibration. Immediately after having placed the bottle, 10 ml of the uppermost layer of the ink was sampled, and the initial absorbancy (A) was measured. Then, after having left the bottle still standing for 6 months, 10 ml of the uppermost layer of the ink was sampled, and the absorbancy (B) after placement was measured. The sedimentary degree (P) was calculated from the following formula (1):

$$P = 100 \times (A-B)/A \tag{1}$$

Here, as mentioned above, P is the sedimentary degree (%), A is the initial absorbency, and B is the absorbancy after placement.

(2) Coloration of Printed Matter

The respective inks were filled into the inkjet printer MJ 8000C (manufactured by Seiko Epson Corporation), and printing was conducted to the following two types of printing media. Moreover, the print duty is as shown in Table 3. This sample was made the initial sample.

The following two types of printing media were used:

Glossy film for inkjets (manufactured by Seiko Epson Corporation)

Super fine paper for inkjets (manufactured by Seiko Epson Corporation)

Next, the power of the printer was turned off in the aforementioned state and left still standing for 6 months with the ink cartridge installed therein.

Six months later, solid printing was conducted to 10 sheets of A4 size paper at 100% duty. With this printing, the ink sequestrated between the ink cartridge and the head will be discharged entirely, and the head will be filled with the ink supplied from the ink cartridge. Printing was conducted in this state to the same printing media as with the initial sample, and was made the print sample after the six-month standstill.

After printing, the respective coloration of the initial sample and the print sample after the six-month standstill were measured with the Gretag SPM50 (Gretag Corporation), and the color difference (ΔE) was sought with the following formula (2):

$$\Delta E = \sqrt{[(L^*_2 - L^*_1)^2 + (a^*_2 - a^*_1)^2 + (b^*_2 - b^*_1)^2]} \quad (2)$$

(Here, L* is the lightness of the printed matter; a* and b* are parameters respectively representing the chroma and hue of the printed matter; and reference numerals 1 and 2 respectively indicate the initial sample and the print sample after the six-month standstill.)

The results of the above were evaluated in three levels in accordance with the standards below, and the results thereof are shown in Table 3.

Evaluation Level A: Color difference is less than 3.
Evaluation Level B: Color difference is more than 3, less than 6.
Evaluation Level C: Color difference is more than 6.

TABLE 3

| | | Evaluation 1 | Evaluation 2 | |
|---|---|---|---|---|
| | Ink (print duty %) | Sedimentary Degree (%) | Glossy Film | Super Fine Paper |
| Example 1 | ink 1 (100%) | 15% | A | A |
| Example 2 | ink 2 (100%) | 40% | A | A |
| Example 3 | ink 3 (100%) | 15% | A | A |
| Example 4 | ink 4 (100%) | 30% | A | A |
| Example 5 | ink 5 (100%) | 15% | A | A |
| Example 6 | ink 6 (100%) | 30% | A | A |
| Example 7 | ink 7 (100%) | 40% | A | A |
| Example 8 | ink 8 (100%) | 60% | A | A |
| Example 9 | ink 2 (20%) + 3 (20%) + 4 (20%) | — | A | A |
| Example 10 | ink 2 (20%) + 5 (50%) + 6 (50%) | — | A | A |
| Example 11 | ink 7 (20%) + 8 (20%) | — | A | A |
| Example 12 | ink 1 (20%) + 2 (20%) + 3 (20%) + 4 (20%) | — | A | A |
| Example 13 | ink 2 (10%) + 3 (10%) + 4 (10%) + 5 (50%) + 6 (50%) | — | A | A |
| Example 14 | ink 1 (10%) + 2 (10%) + 3 (10%) + 4 (10%) + 5 (40%) + 6 (40%) | — | A | A |
| Example 15 | ink 2 (20%) + 3 (20%) + 4 (20%) + 7 (20%) + 8 (20%) | — | A | A |
| Example 16 | ink 1 (20%) + 2 (20%) + 3 (20%) + 4 (20%) + 7 (20%) + 8 (20%) | — | A | A |
| Comparative Example 1 | ink 9 (100%) | 25% | B | A |
| Comparative Example 2 | ink 10 (100%) | 50% | C | B |
| Comparative Example 3 | ink 11 (100%) | 25% | B | B |
| Comparative Example 4 | ink 12 (100%) | 40% | C | B |
| Comparative Example 5 | ink 13 (100%) | 25% | B | B |
| Comparative Example 6 | ink 14 (100%) | 40% | B | B |
| Comparative Example 7 | ink 15 (100%) | 50% | B | B |
| Comparative Example 8 | ink 16 (100%) | 70% | C | C |
| Comparative Example 9 | ink 10 (20%) + 11 (20%) + 12 (20%) | — | C | C |
| Comparative Example 10 | ink 10 (20%) + 13 (50%) + 14 (50%) | — | C | C |
| Comparative Example 11 | ink 15 (20%) + 16 (20%) | — | C | B |

Furthermore, in Table 3, Examples 1~8 are tests of the respective inks utilized for the pigment ink sets of the present invention, Examples 10 and 11 are respectively tests of ink sets arbitrarily utilizing a plurality of such inks, and Examples 9 and 12~16 are examples of the pigment ink sets of this invention.

Conventional aqueous pigment ink sets for color inkjet recording had problems wherein differences in the sedimentary degree between the pigment inks of the respective colors would arise, and the color balance of the printed matter would thereby degenerate. Contrarily, with the aqueous pigment ink sets for color inkjet recording of the present invention, the aforementioned drawback can be resolved by controlling the sedimentary degree of the respective inks to be below a certain fixed value and combining such inks.

What is claimed is:

1. An aqueous pigment ink set for color inkjet recording, comprising: a yellow ink, a cyan ink; and a magenta ink; each of the yellow, cyan and magenta inks comprises a pigment, a dispersant and water, with the respective pigments and dispersants of the yellow, cyan and magenta inks being selected and being present in the respective inks in respective amounts such that a sedimentary degree of the yellow ink is 40% or less, a sedimentary degree of the cyan ink is 30% or less, and a sedimentary degree of the magenta ink is 15% or less.

2. An aqueous pigment ink set for color inkjet recording according to claim 1, wherein the sedimentary degree of the cyan ink is lower than the sedimentary degree of the yellow ink, and the sedimentary degree of the magenta ink is lower than the sedimentary degree of the cyan ink.

3. An aqueous pigment ink set for color inkjet recording according to claim 1, wherein each of the yellow ink, the cyan ink, and the magenta ink has a lightness of a different altitude and the respective sedimentary degrees of the yellow, cyan and magenta inks are such that an ink in the ink set having a lightness of a higher altitude than another ink in the ink set also has a higher sedimentary degree.

4. An aqueous pigment ink set for color inkjet recording according to claim 1, wherein the pigment for the yellow ink is C.I. pigment yellow 74, C.I. pigment yellow 109, or C.I. pigment yellow 110; the pigment for the cyan ink is C.I. pigment blue 15:3; and the pigment for the magenta ink is C.I. pigment red 122.

5. An aqueous pigment ink set for color inkjet recording, comprising: a yellow ink; a cyan ink; a magenta ink; and a black ink; wherein each of the yellow, cyan, magenta and black inks comprises a pigment, a dispersant and water, with the respective pigments and dispersants of the yellow, cyan, magenta and black inks being selected and being present in the respective inks in respective amounts such that a sedimentary degree of the yellow ink is 40% or less, a sedimentary degree of the cyan ink is 30% or less, a sedimentary degree of the magenta ink is 15% or less, and a sedimentary degree of the black ink is 15% or less.

6. An aqueous pigment ink set for color inkjet recording according to claim 5, wherein the sedimentary degree of the cyan ink is lower than the sedimentary degree of the yellow ink, and the sedimentary degree of the magenta ink and the black ink is lower than the sedimentary degree of the cyan ink.

7. An aqueous pigment ink set for color inkjet recording according to claim 5, wherein each of the yellow ink, the cyan ink, the magenta ink, and the black ink has a lightness of a different altitude and the respective sedimentary degrees of the yellow, cyan, magenta and black inks are such that an ink in the ink set having a lightness of a higher altitude than another ink in the ink set also has a higher sedimentary degree.

8. An aqueous pigment ink set for color inkjet recording according to claim 7, wherein the pigment for the yellow ink is C.I. pigment yellow 74, C.I. pigment yellow 109, or C.I. pigment yellow 110; the pigment for the cyan ink is C.I. pigment blue 15:3; the pigment for the magenta ink is C.I. pigment red 122; and the pigment for the black ink is carbon black.

9. An aqueous pigment ink set for color inkjet recording, comprising: a yellow ink; a cyan ink; a magenta ink; and a light cyan ink and/or a light magenta ink; wherein each of the yellow, cyan, magenta and light cyan and/or light magenta inks comprises a pigment, a dispersant and water, with the respective pigments and dispersants of the yellow, cyan, magenta and light cyan and/or light magenta inks being selected and being present in the respective inks in respective amounts such that a sedimentary degree of the yellow ink is 40% or less, a sedimentary degree of the cyan ink is 30% or less, a sedimentary degree of the light cyan ink is 30% or less, a sedimentary degree of the magenta ink is 15% or less, and a sedimentary degree of the light magenta ink is 15% or less.

10. An aqueous pigment ink set for color inkjet recording according to claim 9, wherein the sedimentary degree of the cyan ink and the light cyan ink is lower than the sedimentary degree of the yellow ink, and the sedimentary degree of the magenta ink and the light magenta ink is lower than the sedimentary degree of the cyan ink and the light cyan ink.

11. An aqueous pigment ink set for color inkjet recording according to claim 9, wherein the pigment for the yellow ink is C.I. pigment yellow 74, C.I. pigment yellow 109, or C.I. pigment yellow 110; the pigment for the cyan ink is C.I. pigment blue 15:3; the pigment for the light cyan ink is C.I. pigment blue 15:3; the pigment for the magenta ink is C.I. pigment red 122; and the pigment for the light magenta ink is pigment red 122.

12. An aqueous pigment ink set for color inkjet recording, comprising: a yellow ink; a cyan ink; a magenta ink; a light cyan ink and/or a light magenta ink; and a black ink; wherein each of the yellow, cyan, magenta, light cyan and/or light magenta, and black inks comprises a pigment, a dispersant and water, with the respective pigments and dispersants of the yellow, cyan, magenta, light cyan and/or light magenta, and black inks being selected and being present in the respective inks in respective amounts such that a sedimentary degree of the yellow ink is 40% or less, a sedimentary degree of the cyan ink is 30% or less, a sedimentary degree of the light cyan ink is 30% or less, a sedimentary degree of the magenta ink is 15% or less, a sedimentary degree of the light magenta ink is 15% or less, and a sedimentary degree of the black ink is 15% or less.

13. An aqueous pigment ink set for color inkjet recording according to claim 12, wherein the sedimentary degree of the cyan ink and the light cyan ink is lower than the sedimentary degree of the yellow ink, and the sedimentary degree of the magenta ink, the light magenta ink, and the black ink is lower than the sedimentary degree of the cyan ink and the light cyan ink.

14. An aqueous pigment ink set for color inkjet recording according to claim 12, wherein the pigment for the yellow ink is C.I. pigment yellow 74, C.I. pigment yellow 109, or C.I. pigment yellow 110; the pigment for the cyan ink is C.I. pigment blue 15:3; the pigment for the light cyan ink is C.I. pigment blue 15:3; the pigment for the magenta ink is C.I. pigment red 122; the pigment for the light magenta ink is pigment red 122; and the pigment for the black ink is carbon black.

15. An aqueous pigment ink set for color inkjet recording, comprising: a green ink and/or an orange ink; a yellow ink; a cyan ink; and a magenta ink; wherein each of the green, and/or orange, yellow, cyan and magenta inks comprises a pigment, a dispersant and water, with the respective pigments and dispersants of the green, and/or orange, yellow, cyan and magenta inks being selected and being present in the respective inks in respective amounts such that a sedimentary degree of the green ink is 60% or less, a sedimentary degree of the yellow ink is 40% or less, a sedimentary degree of orange ink is 40% or less, a sedimentary degree of the cyan ink is 30% or less, and a sedimentary degree of the magenta ink is 15% or less.

16. An aqueous pigment ink set for color inkjet recording according to claim 15, wherein the sedimentary degree of the yellow ink and the orange ink is lower than the sedimentary degree of the green ink, the sedimentary degree of the cyan ink is lower than the sedimentary degree of the yellow ink and the orange ink, and the sedimentary degree of the magenta ink is lower than the sedimentary degree of the cyan ink.

17. An aqueous pigment ink set for color inkjet recording according to claim 15, wherein the pigment for the green ink is C.I. pigment green 7 or C.I. pigment green 36; the pigment for the yellow ink is C.I. pigment yellow 74, C.I. pigment yellow 109, or C.I. pigment yellow 110; the pigment for the orange ink is C.I. pigment orange 36 or C.I. pigment orange 43; the pigment for the cyan ink is C.I. pigment blue 15:3; and the for the magenta ink is C.I. pigment red 122.

18. An aqueous pigment ink set for color inkjet recording, comprising: a green ink and/or an orange ink; a yellow ink; a cyan ink; a magenta ink; and a black ink; wherein each of the green, and/or orange, yellow, cyan , magenta and black inks comprises a pigment, a dispersant an water, with the respective pigments and dispersants of the green, and/or orange, yellow, cyan, magenta and black inks being selected and being present in the respective inks in respective amounts such that a sedimentary degree of the green ink is 60% or less, a sedimentary degree of the yellow ink is 40% or less, a sedimentary degree of the orange ink is 40% or less, a sedimentary degree of the cyan ink is 30% or less, a sedimentary degree of the magenta ink is 15% or less, and a sedimentary degree of the black ink is 15% or less.

19. An aqueous pigment ink set for color inkjet recording according to claim 18, wherein the sedimentary degree of the yellow ink and the orange ink is lower than the sedimentary degree of the green ink, the sedimentary degree of the cyan ink is lower than the sedimentary degree of the yellow ink and the orange ink, and the sedimentary degree of the magenta ink and the black ink is lower than the sedimentary degree of the cyan ink.

20. An aqueous pigment ink set for color inkjet recording according to claim 18, wherein the pigment for the green ink is C.I. pigment green 7 or C.I. pigment green 36; the pigment for the yellow ink is C.I. pigment yellow 74, C.I. pigment yellow 109, or C.I. pigment yellow 110; the pigment for the orange ink is C.I. pigment orange 36 or C.I. pigment orange 43; the pigment for the cyan ink is C.I. pigment blue 15:3; the pigment for the magenta ink is C.I. pigment red 122; and the colorant for the black ink is black carbon.

21. A method for ink jet recording comprising:

(a) providing the ink set of claim 1; and (b) depositing each of the yellow, cyan, and magenta inks onto a recording medium to form an image thereon.

22. A method for ink jet recording comprising:

(a) providing the ink jet of claim 2; and (b) depositing each of the yellow, cyan and magenta inks onto a recording medium to form an image thereon.

\* \* \* \* \*